United States Patent [19]

Slama

[11] 4,187,261
[45] Feb. 5, 1980

[54] VINYL AROMATIC POLYMERIZATION PROCESS

[75] Inventor: Francis J. Slama, Aurora, Ill.

[73] Assignee: Standard Oil Company (Indiana), Chicago, Ill.

[21] Appl. No.: 908,839

[22] Filed: May 23, 1978

[51] Int. Cl.² ............................................. C08F 279/02
[52] U.S. Cl. ........................................................ 525/243
[58] Field of Search ........................................ 260/880 R

[56] References Cited

U.S. PATENT DOCUMENTS

| 3,658,946 | 4/1972 | Bronstert et al. | 260/880 R |
| 3,903,200 | 9/1975 | Cincera et al. | 260/880 R |
| 3,903,202 | 9/1975 | Carter et al. | 260/880 R |
| 3,945,976 | 3/1976 | McCurdy | 260/880 R |
| 4,011,284 | 3/1977 | Gawne et al. | 260/880 R |

*Primary Examiner*—William F. Hamrock
*Attorney, Agent, or Firm*—Wallace L. Oliver; Arthur G. Gilkes; William T. McClain

[57] ABSTRACT

Limiting final conversion of monomer to polymer in a multiple stage, vinyl aromatic-rubber mass polymerization system to about 50 to about 89 percent produces a polymer with increased impact strength and decreases residence time, thereby increasing the production capacity of the system.

10 Claims, No Drawings

VINYL AROMATIC POLYMERIZATION PROCESS

BACKGROUND OF THE INVENTION

This invention relates to increasing the impact resistance in rubber-modified vinyl aromatic polymers while reducing residence time in polymerization system.

The desirability of producing higher impact resistant vinyl aromatic polymer, such as rubber-modified styrene polymer, it is well known in the art. Compositions and methods have been developed which produce high impact polystyrene by the incorporation of a rubber-polystyrene discrete phase into a polystyrene matrix. In a plug-flow, continuous vinyl polymer manufacturing system similar to that disclosed in U.S. Pat. No. 3,945,976, incorporated herein by reference, the total residence time typically ranges from about 10 to 20 hours. A method which decreases the residence time, thereby increasing effective capacity, without sacrificing physical properties, would be important commercially. A method which actually improves physical properties would be very desirable.

SUMMARY OF THE INVENTION

Limiting final conversion of monomer to polymer in a multiple stage, vinyl aromatic-rubber mass polymerization system to about 50 to about 89 percent produces a polymer with increased impact strength and decreases residence time, thereby increasing the production capacity of the system.

BRIEF DESCRIPTION OF THE INVENTION

In the production of rubber-modified vinyl aromatic polymer in a continuous, plug-flow, multiple-stage system, a solution of vinyl aromatic monomer and rubber are polymerized with agitation in multiple polymerization zones.

The process of this invention can be practiced in a continuous or batch mass polymerization system, although a continuous system typically is used commercially. A continuous process can be simulated by a batch reactor programmed to increase temperature and decrease agitation rate as a function of time. Typically, in a continuous process a monomer-rubber solution is introduced into a first stage where free radical polymerization initiates either thermally or by use of a polymerization initiator. This solution is agitated sufficiently to mix the components thoroughly and, as polymerization continues, the polymerizing mass is pumped into one or more additional reactors in which varying temperature-agitation levels are maintained. As the first polymerizing mass travels through the series of reactors, the temperature increases while the agitation rate decreases. The final polymerization stage need not be agitated.

After the polymerization begins, the system separates into two phases. Initially, the rubber in styrene is present in the larger amount and is the major or continuous phase. As the reaction proceeds and more polystyrene is formed, a phase inversion occurs whereupon the polystyrene in styrene becomes the continuous phase. At the phase inversion point the system must be agitated sufficiently to disperse the polystyrene-grafted rubber phase into roughly spherical particles which act to reinforce an otherwise brittle polystyrene matrix. Conventionally, polymerization is continued to a level in the last reactor stage such that about 95 percent of monomer has been converted to polymer. Typically, polymeric material removed from the last reactor stage is devolatilized to remove residual monomer.

The process used in this invention is a substantially solventless mass thermal process under free radical conditions. Although contaminants in the styrene monomer, such as ethylbenzene, can be built up by recycle, (e.g., up to about 6%), this process substantially is free of inert solvent. Although normally polymerization is initiated thermally, suitable free radical initiators can be used.

In the process of this invention, vinyl aromatic monomer, preferably styrene, is mass polymerized such that the product taken from the final reactor stage, before devolatilization, is about 50 to about 89 percent converted to polymer. Typically, the polymerization residence time used in this invention ranges from about 3 to about 8 hours. Generally, the temperature of the polymerizing monomer ranges from about 120° C. at initiation of polymerization up to about 225° C. when product is withdrawn from the last polymerization reactor. The temperatures maintained in the reactors, generally, are not as critical as the conversion level achieved.

In one embodiment of this invention in which polymerization occurs in three reactors of approximately equal volumes, monomer to polymer conversions levels range (a) in the first reactor from about 20 to about 55 percent, preferably about 25 to about 35 percent; (b) in the second reactor from about 45 to about 75 percent, preferably from about 60 to about 70 percent; and (c) in the third reactor from about 50 to about 89 percent, preferably from about 82 to about 86 percent.

Temperatures in a three-reactor system typically range (a) in the first reactor from about 120° to about 150° C., preferably about 130° to about 140° C.; (b) in the second reactor from about 148° to about 170° C., preferably from about 150° to about 155° C.; and (c) in the third reactor from about 160° to about 225° C., preferably about 165° to about 180° C.

Sufficient agitation is maintained in the first two reactor stages to disperse rubber particles adequately within the polymerizing mass. Typically, the last stage need not be agitated. The level of agitation required in a specific reactor system can be optimized readily up routine experimentation.

Although the polymerization system described above consists of three reactor stages, the number of stages can be varied as long as the sequence of temperature ranges and agitation substantially is maintained.

In another embodiment, the process of this invention can be practiced can be practiced using free radical polymerization initiators in the first stage of polymerization. Suitable initiators include t-butyl peracetate, benzoyl peroxide and lauroyl peroxide. The use of such initiators allows polymerization to begin at a lower temperature such as about 90° C. When using a suitable initiator such as lauroyl peroxide, the final conversion may be allowed to come to a slightly higher level than a system without such an initiator.

Generally, the conversion level at a point in the reactor series is determined by the pumping rate of the polymerizing mass through the reactor series. The low final conversions in the process of this invention usually necessitate greater devolatilization, recycle and heat transfer capacity.

The vinyl aromatic monomer useful in this invention typically is a monovinyl aromatic such as styrene or vinyl toluene. Styrene is the preferred monomer useful in this invention.

Rubbers which can be used in this invention include polybutadiene (PBD) and styrene-butadiene (SBR) rubbers. Typically, useful PBD rubbers are linear and branched polymers of butadiene containing from 25 to 99 percent cis content with less than 20 percent free vinyl unsaturation (i.e., 1, 2-addition). A commonly used PBD would contain about 35 percent cis and about 14 percent free vinyl unsaturation. Solution viscosities for useful PBD's range from 25 to 220 centipoise and preferably range from 70 to 190 centipoise measured at a concentration of 5 percent by weight in styrene at 30° C. Useful SBR rubbers are random or block copolymers of butadiene and styrene, or combinations thereof, with 5 to 50 percent bound styrene. Typical solution viscosities are 20 to 190 centipoise and typical Mooney viscosities are 30 to 120. These rubbers can be present in styrene polymers at levels from about 2 to 20 percent and typically from about 3 to 10 percent. Since in the process of this invention polymerization proceeds only to about 50 to about 89 percent conversion, the starting monomer-rubber solution should contain a proportionately lower content of rubber to achieve a desired rubber content in a final polymer.

In addition to the vinyl aromatic monomer and rubber, up to about 10 percent of other materials can be included in the polymerization feedstock, such as stabilizers, antioxidants, colorants, flame retardants, and lubricants.

The polymers formed using the method of this invention generally show good physical properties. Especially unexpected is the relatively high Izod impact values which typically range up to about 3.5 ft.-lb./inch. Such effect may be attributed to a high number average molecular weight, low degree of crosslinking, higher effective rubber levels and rubber particle morphology. The rubber particle morphology of polymers of this invention shows thinner walls, smaller inclusions and more regular network structures than normally-observed sytrene polymer. In addition, the polymers of this invention contained a higher rubber level in the final product than normally produced polymers, although this effect (about 9 percent rubber versus about 8 percent) is thought insufficient to cause the demonstrative increase in Izod impact strength. In fact, the observed increase in Izod value probably is due to a combination of factors rather than from a single cause. Polymer orientation during molding apparently does not contribute to the increase in Izod value.

This invention is demonstrated but not limited by the following examples.

EXAMPLES I–XII

A series of styrene polymerizations were performed in a one-half gallon Chemco stainless steel reactor fitted with a valve through which molten polymer can be withdrawn, a four-blade agitator and an internal cooling coil. A feedstock comprising styrene monomer containing 8 wt.% of a polybutadiene rubber having about 35 percent cis and about 14 percent vinyl content (Firestone Diene 55), 4 wt.% mineral oil lubricant and 0.25 wt.% BHT antioxidant was polymerized in such apparatus. Agitation was maintained in the reactor at 50 to 80 revolutions per minute (rpm) for about one to two hours after which time agitation was slowed to 15 rpm for the remainder of the reaction. The feedstock was polymerized in three distinct temperature stages identified as R1, R2 and R3 respectively. The level of conversion was measured after each step. In some experiments a fourth higher temperature stage was used which is identified as R3B. The conditions used during these polymerizations are listed in Table I. After polymerization, the resulting product was devolatilized in a Brabender ⅜-inch vented extruder before testing. The results of these tests also are shown in Table I.

EXAMPLE XIII–XVIII

Another series of polymerizations were run using the techniques described in Examples I–XII, which included an amount of a free radical initiator in the feedstock. The polymerization conditions and the resulting polymer properties are shown in Table II.

Table I

| Example (Run) | (A) | (B) | (C) | I |
|---|---|---|---|---|
| R1 | | | | |
| Conversion (%) | 30 | — | 17 | 37 |
| Time (Min.) | 70 | 70 | 70 | 70 |
| Temperature (°C.) | 135 | 135 | 133 | 134 |
| R2 | | | | |
| Conversion (%) | 71 | — | 81 | 80 |
| Time (Min.) | 70 | 70 | 70 | 70 |
| Temperature (°C.) | 150 | 150 | 152 | 151 |
| R3 (R3B) | | | | |
| Conversion (%) | — | 90 | 95 | 88 |
| Time (Min.) | 35 | 35 | 35 | 35 |
|  | (35) |  | (35) |  |
| Temperature (°C.) | 184 | 184 | 184 | 184 |
|  | (210) |  | (210) |  |
| Initial Agitation | | | | |
| Time (Hours) | 1.14 | 1.14 | 1.14 | 2.14 |
| rpm | 80 | 80 | 80 | 80 |
| ASTM Measurements | | | | |
| Izod (ft.-lb./in.) | 1.26 | 0.91 | 0.30 | 1.8 |
| Elongation (%) | 43 | 47 | 35 | 42 |
| Yield Tensile Strength | 2500 | 2500 | 2500 | 2800 |
| Ultimate Tensile Strength | 2900 | 2400 | 2500 | 2300 |
| Heat Distortion Temp. (°C.) | 116 | 111 | 113 | 112 |
| Melt Flow Rate (g/10 min.) | 5.5 | 14 | 33 | 8.3 |
| Molecular Weight | | | | |
| $\overline{M}w$ ($\times 10^{-3}$) | 106 | 160 | 124 | — |
| $\overline{M}n$ ($\times 10^{-3}$) | 24 | 47 | 42 | — |
| $\overline{M}w/\overline{M}n$ | 4.3 | 3.4 | 3.0 | — |
| Particle Size (microns) | | | | |
| Average | 4 | 4 | 4 | 9 |
| Maximum | 10 | 6 | 6 | 18 |

| Example (Run) | II | III | IV | V |
|---|---|---|---|---|
| R1 | | | | |
| Conversion (%) | 37 | 34 | 20 | 20 |
| Time (Minutes) | 70 | 70 | 70 | 70 |
| Temperature (°C.) | 132 | 133 | 132 | 132 |
| R2 | | | | |
| Conversion (%) | 64 | 58 | 69 | 81 |
| Time (Min.) | 70 | 70 | 70 | 70 |
| Temperature (°C.) | 150 | 150 | 151 | 153 |
| R3 (R3B) | | | | |
| Conversion (%) | 82 | 85 | 88 | 88 |
| Time (Min.) | 35 | 35 | 70 | 70 |
| Temperature (°C.) | 170 | 170 | 180 | 180 |
| Initial Agitation | | | | |
| Time (Hours) | — | 2.17 | 2.17 | 2.17 |
| rpm | 80 | 80 | 80 | 80 |
| ASTM Measurements | | | | |
| Izod (ft.-lb./in.) | 3.2 | 3.7 | 2.1 | 0.91 |
| Elongatin (%) | 44 | 48 | 54 | 48 |
| Yield Tensile Strength | 3200 | 3400 | 3100 | 2400 |
| Ultimate Tensile Strength | 2600 | 2700 | 3000 | 2300 |
| Heat Distortion Temp. (°C.) | 114 | 113 | 113 | 112 |
| Melt Flow Rate (g/10 min.) | 4.2 | 2.3 | 4.9 | 17 |
| Molecular Weight | | | | |
| $\overline{M}w$ ($\times 10^{-3}$) | 196 | 215 | 190 | 128 |
| $\overline{M}n$ ($\times 10^{-3}$) | 82 | 78 | 77 | 28 |
| $\overline{M}w/\overline{M}n$ | 2.4 | 2.7 | 2.5 | 4.6 |

Table I-continued

| | | | | |
|---|---|---|---|---|
| Particle Size (microns) | | | | |
| Average | 4 | 6 | 3 | 3 |
| Maximum | — | 20 | 5 | 4 |

| Example (Run) | (D) | VI | VII | (E) |
|---|---|---|---|---|
| R1 | | | | |
| Conversion (%) | 15 | 26 | 16 | 16 |
| Time (Min.) | 70 | 180 | 70 | 70 |
| Temperature (°C.) | 119 | 122 | 133 | 133 |
| R2 | | | | |
| Conversion (%) | 84 | 73 | 65 | 69 |
| Time (Min.) | 70 | 70 | 70 | 70 |
| Temperature (°C.) | 150 | 150 | 150 | 150 |
| R3 (R3B) | | | | |
| Conversion (%) | 91 | 84 | 89 | 91 |
| Time (Min.) | 70 | 70 | 70 | 70 |
| Temperature (°C.) | 180 | 170 | 170 | 180 |
| Initial Agitation | | | | |
| Time (Hours) | 2.17 | 4.5 | 2.17 | 2.17 |
| rpm | 80 | 80 | 80 | 80 |
| ASTM Measurements | | | | |
| Izod (ft./lb./in.) | 0.48 | 3.1 | 2.0 | 1.78 |
| Elongation (%) | 22 | 53 | 48 | 41 |
| Yield Tensile Strength | 2000 | 3400 | 2900 | 2800 |
| Ultimate Tensile Strength | 2000 | 2700 | 2600 | 2500 |
| Heat Distortion Temp. (°C.) | 109 | 114 | 114 | 112 |
| Melt Flow Rate (g/10 min.) | 23 | 3.1 | 4.5 | 5.6 |
| Molecular Weight | | | | |
| $\overline{M}w$ ($\times 10^{-3}$) | 94 | 198 | 180 | 150 |
| $\overline{M}n$ ($\times 10^{-3}$) | 44 | 77 | 61 | 56 |
| $\overline{M}w/\overline{M}n$ | 2.1 | 2.6 | 2.9 | 2.7 |
| Particle Size (microns) | | | | |
| Average | 6 | 3 | 2 | 2 |
| Maximum | 15 | 9 | 3 | 4 |

| Example (Run) | VIII | IX | X | XI |
|---|---|---|---|---|
| R1 | | | | |
| Conversion (%) | 24 | 24 | 33 | 52 |
| Time (Min.) | 70 | 70 | 70 | 70 |
| Temperature (°C.) | 135 | 137 | 139 | 143 |
| R2 | | | | |
| Conversion (%) | 67 | 70 | 56 | 71 |
| Time (Min.) | 70 | 70 | 70 | 70 |
| Temperature (°C.) | 150 | 150 | 147 | 143 |
| R3 (R3B) | | | | |
| Conversion (%) | 87 | 89 | 88 | 87 |
| Time (Min.) | 70 | 70 | 70 | 70 |
| Temperature (°C.) | 170 | 170 | 170 | 170 |
| Initial Agitation | | | | |
| Time (Hours) | 2.17 | 2.17 | 2.17 | 2.17 |
| rpm | 80 | 80 | 80 | 80 |
| ASTM Measurements | | | | |
| Izod (ft.-lb./in.) | 3.1 | 3.3 | 2.7 | 2.6 |
| Elongation (%) | 42 | 48 | 47 | 50 |
| Yield Tensile Strength | 3200 | 3200 | 3500 | 2800 |
| Ultimate Tensile Strength | 2600 | (1) | 2600 | (1) |
| Heat Distortion Temp. (°C.) | 116 | 116 | 113 | 112 |
| Melt Flow Rate (9/10 min.) | 4.2 | 3.2 | 3.2 | 5.3 |
| Molecular Weight | | | | |
| $\overline{M}w$ ($\times 10^{-3}$) | 190 | 192 | 194 | 179 |
| $\overline{M}n$ ($\times 10^{-3}$) | 85 | 73 | 74 | 72 |
| $\overline{M}w/\overline{M}n$ | 2.2 | 2.6 | 2.6 | 2.5 |
| Particle Size (microns) | | | | |
| Average | 3 | 2 | 6 | 2 |
| Maximum | 7 | 4 | — | 5 |

| Example (Run) | XII | (F) | (G) | (H) |
|---|---|---|---|---|
| R1 | | | | |
| Conversion (%) | 71 | 17 | 24 | 20 |
| Time (Min.) | 70 | 70 | 105 | 105 |
| Temperature (°C.) | 149 | 132 | 132 | 132 |
| R2 | | | | |
| Conversion (%) | 84 | 76 | 79 | 75 |
| Time (Min.) | 70 | 70 | 105 | 105 |
| Temperature (°C.) | 143 | 150 | 150 | 150 |
| Re (R3B) | | | | |
| Conversion (%) | 89 | 90 | 94 | 90 |
| Time (Min.) | 70 | 70 | 55 | 55 |
| Temperature (°C.) | 170 | 160 | (55) 180 (210) | 180 |
| Initial Agitation | | | | |
| Time (Hours) | 2.17 | 2.17 | 2.0 | 2.0 |
| rpm | 80 | 80 | 50 | 50 |
| ASTM Measurements | | | | |
| Izod (ft.-lb./in.) | 2.3 | 1.5 | 1.32 | 1.56 |
| Elongatin (%) | 48 | 50 | 49 | 49 |
| Yield Tensile Strength | 2700 | 2400 | 2400 | 2400 |
| Ultimate Tensile Strenngth | 2400 | 2200 | 2900 | 2600 |
| Heat Distortion Temp. (°C.) | 113 | 110 | 114 | 115 |
| Melt Flow Rate (g/10 min.) | 6.7 | 9.8 | 5.5 | 5.3 |
| Molecular Weight | | | | |
| $\overline{M}u$ ($\times 10^{-3}$) | 147 | 165 | 152 | 155 |
| $\overline{M}n$ ($\times 10^{-3}$) | 63 | 57 | 44 | 55 |
| $\overline{M}w/\overline{M}n$ | 2.3 | 2.9 | 3.5 | 2.8 |
| Particle Size (microns) | | | | |
| Average | 5 | 2 | 5 | 5 |
| Maximum | 11 | 4 | 10 | 12 |

| Example (Run) | (J) | (K) |
|---|---|---|
| R1 | | |
| Conversion (%) | 40 | 51 |
| Time (Min.) | 90 | 90 |
| Temperature (°C.) | 140 | 140 |
| R2 | | |
| Conversion (%) | 78 | 86 |
| Time (Min.) | 90 | 90 |
| Temperature (°C.) | 152 | 152 |
| R3 (R3B) | | |
| Conversion (%) | 94 | 90 |
| Time (Min.) | 45 (45) | 45 |
| Temperature (°C.) | 180 (210) | 180 |
| Initial Agitation | | |
| Time (Hours) | 1.5 | 3.75 |
| rpm | 60 | 60 |
| ASTM Measurements | | |
| Izod (ft.-lb./in.) | 1.65 | 2.3 |
| Elongation (%) | 51 | 50 |
| Yield Tensile Strength | 2500 | 2900 |
| Ultimate Tensile Strength | 2800 | (1) |
| Heat Distortion Temp. (°C.) | 114 | 116 |
| Melt Flow Rate (g/10 min.) | 98 | 3.6 |
| Molecular Weight | | |
| $\overline{M}w$ ($\times 10^{-3}$) | 166 | 183 |
| $\overline{M}n$ ($\times 10^{-3}$) | 64 | 69 |
| $\overline{M}w/\overline{M}n$ | 2.6 | 2.7 |
| Particle Size (microns) | | |
| Average | — | 5 |
| Maximum | 9 | 10 |

(1) Did not break

Table II

| Example (Run) | XIII | XIV | XV | XVI |
|---|---|---|---|---|
| Initiator[1] | TBP | TBP | TBP | TBP |
| (moles × 10⁵) | (2.6) | (2.6) | (2.7) | (2.7) |
| R1 | | | | |
| Conversion (%) | 21 | 31 | 31 | 44 |
| Time (Min.) | 70 | 70 | 70 | 70 |
| Temperature (°C.) | 120 | 121 | 120 | 120 |
| R2 | | | | |
| Conversion (%) | 49 | 61 | 63 | 71 |
| Time (Min.) | 70 | 70 | 70 | 70 |
| Temperature (°C.) | 135 | 136 | 140 | 145 |
| R3 | | | | |
| Conversion (%) | 84 | 87 | 87 | 86 |
| Time (Min.) | 35 | 70 | 70 | 70 |
| Temperature | 170 | 170 | 170 | 170 |
| Initial Agitation | | | | |
| Time (Hours) | 2.17 | 2.17 | 2.17 | 2.17 |
| rpm | 80 | 80 | 80 | 80 |
| ASTM Measurements | | | | |
| Izod (ft.-lb./in) | 2.2 | 1.62 | 1.89 | 2.1 |

Table II-continued

| | | | | |
|---|---|---|---|---|
| Elongation (%) | 54 | 52 | 49 | 49 |
| Yield Tensile Strength | 3100 | 2600 | 2900 | 3400 |
| Ultimate Tensile Strength | 290 | 2600 | 1100 | 2900 |
| Heat Distortion Temp. (°C.) | 111 | 112 | 113 | 116 |
| Melt Flow Rate (g/10 min.) | 4.8 | 4.0 | 4.9 | 6.0 |
| Molecular Weight | | | | |
| $\overline{M}w$ ($\times 10^{-3}$) | 1163 | 177 | 159 | 179 |
| $\overline{M}n$ ($\times 10^{-3}$) | 52 | 75 | 67 | 71 |
| $\overline{M}w/\overline{M}n$ | 2.8 | 2.4 | 2.4 | 2.4 |
| Particle Size | | | | |
| Average | 4 | 5 | 6 | 3 |
| Maximum | 15 | 12 | 12 | 7 |

| Example (Run) | XVII | (L) | (M) | (N) |
|---|---|---|---|---|
| Initiator[1] | TBP | TBP | BP | BP |
| (moles × 10^5) | (2.7) | (2.7) | (2.7) | (2.8) |
| R1 | | | | |
| Conversion (%) | 24 | 32 | 4 | 7.3 |
| Time (Min.) | 70 | 70 | 70 | 70 |
| Temperature (°C.) | 119 | 119 | 86 | 89 |
| R2 | | | | |
| Conversion (%) | 77 | 80 | 79 | 84 |
| Time (Min.) | 70 | 70 | 70 | 70 |
| Temperature (°C.) | 150 | 150 | 151 | 151 |
| R3 | | | | |
| Conversion (%) | 86 | 90 | 92 | 91 |
| Time (Min.) | 70 | 70 | 70 | 70 |
| Temperature | 170 | 180 | 180 | 180 |
| Initial Agitation | | | | |
| Time (Hours) | 2.17 | 2.17 | 2.17 | 2.17 |
| rpm | 80 | 80 | 80 | 80 |
| ASTM Measurements | | | | |
| Izod (ft./lb./in) | 2.3 | 0.97 | 0.68 | 0.79 |
| Elongation (%) | 51 | 39 | 32 | 40 |
| Yield Tensile Strength | 3100 | 2400 | 2100 | 2200 |
| Ultimate Tensile Strength | 2900 | 2900 | 2200 | 2300 |
| Heat Distortion Temp. (°C.) | 113 | 111 | 111 | 112 |
| Melt Flow Rate (g/10 min.) | 4.0 | 13 | 17 | 20 |
| Molecular Weight | | | | |
| $\overline{M}w$ ($\times 10^{-3}$) | 135 | 111 | 105 | 98 |
| $\overline{M}n$ ($\times 10^{-3}$) | 64 | 47 | 39 | 38 |
| $\overline{M}w/\overline{M}n$ | 2.1 | 2.4 | 2.7 | 2.6 |
| Particle Size | | | | |
| Average | 8 | 3 | 10 | 8 |
| Maximum | 30 | 8 | 20 | 15 |

| Example (Run) | (O) | (P) | XVIII |
|---|---|---|---|
| Initiator[1] | BP | BP | BP |
| (moles × 10^5) | (2.8) | (5.0) | (6.0) |
| R1 | | | |
| Conversion (%) | 4 | 14 | 36 |
| Time (Min.) | 70 | 70 | 70 |
| Temperature (°C.) | 93 | 93 | 97 |
| R2 | | | |
| Conversion (%) | 87 | 76 | 79 |
| Time (Min.) | 70 | 70 | 70 |
| Temperature (° C.) | 151 | 151 | 151 |
| R3 | | | |
| Conversion (%) | 92 | 90 | 89 |
| Time (Min.) | 70 | 70 | 70 |
| Temperature | 180 | 180 | 180 |
| Initial Agitatin | | | |
| Time (Hours) | 2.17 | 2.17 | 2.17 |
| rpm | 80 | 80 | 80 |
| ASTM Measurements | | | |
| Izod (ft.-lb./in) | 0.63 | 0.87 | 1.59 |
| Elongation (%) | 31 | 40 | 43 |
| Yield Tensile Strength | 2100 | 2300 | 2700 |
| Ultimate Tensile Strength | 2100 | 2100 | 2400 |
| Heat Distortion Temp. (°C.) | 109 | 113 | 113 |
| Melt Flow Rate (g/10 min.) | 23 | 21 | 11 |
| Molecular Weight | | | |
| $\overline{M}w$ ($\times 10^{-3}$) | 94 | 93 | 134 |
| $\overline{M}n$ ($\times 10^{-3}$) | 36 | 38 | 51 |
| $\overline{M}w/\overline{M}n$ | 2.6 | 2.4 | 2.6 |
| Particle Size | | | |
| Average | 8 | 9 | 5 |
| Maximum | 20 | 30 | 15 |

[1] TBP-t-Butyl peracetate; BP--Benzoyl peroxide

The data presented above show that a vinyl aromatic polymerization system in which a styrene-rubber solution is polymerized at final conversions of about 50 to 89% produce polymeric product with good physical properties while maintaining low residence time in the system.

I claim:

1. In a three-stage, plug flow, continuous, mass polymerization process in which vinyl aromatic polymer is polymerized in the presence of a rubber with sufficient agitation to disperse rubber particles adequately, the improvement which comprises (a) in the first stage conversion of monomer to polymer is between about 20 to about 55 percent and the temperature is about 120° C. to about 150° C.; (b) in the second stage conversion of monomer to polymer is between about 45 to about 75 percent and the temperature is about 148° C. to about 170° C.; and in the final reactor stage conversion of monomer to polymer is between about 50 to about 89 percent and the temperature is about 160° C. to about 225° C.

2. The process of claim 1 wherein the vinyl aromatic monomer is styrene monomer.

3. The process of claim 1 wherein final conversion is limited to between about 82 to about 86 percent.

4. The process of claim 2 wherein polymerization occurs in a three-reactor polymerization system.

5. The process of claim 2 wherein polymerization occurs in a three-reactor polymerization system.

6. The process of claim 5 wherein monomer to polymer conversion levels range (a) in the first reactor from about 20 to about 55 percent; (b) in the second reactor from about 45 to about 75 percent; and (c) in the third reactor from about 50 to 89 percent.

7. The process of claim 6 wherein monomer to polymer conversion levels range (a) in the first reactor from about 25 to about 35 percent; (b) in the second reactor from about 45 to about 75 percent; and (c) in the third reactor from about 82 to about 86 percent.

8. The process of claim 1 wherein polymerization is initiated by a free radical initiator.

9. The process of claim 8 wherein the free radical initiator is t-butyl peracetate, benzoyl peroxide or lauroyl peroxide.

10. The process of claim 7 wherein the temperature in the first stage is about 130° C. to about 140° C., the temperature in the second stage is about 150° C. to about 155° C. and the temperature in the final stage is about 165° C. to about 180° C.

* * * * *